Aug. 14, 1928.

G. J. PALAITH 1,680,632

SPRING COLLAR FOR LATHES AND SCREW MACHINES

Filed March 28, 1927 2 Sheets-Sheet 1

Inventor
G. J. Palaith
By H. J. Sanders
Atty.

Aug. 14, 1928.                                           1,680,632
G. J. PALAITH
SPRING COLLAR FOR LATHES AND SCREW MACHINES
Filed March 28, 1927        2 Sheets-Sheet 2
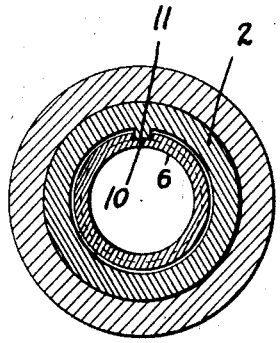
Fig. 4
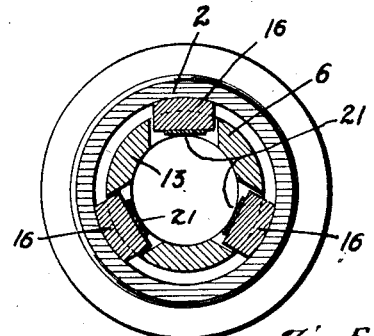
Fig. 5
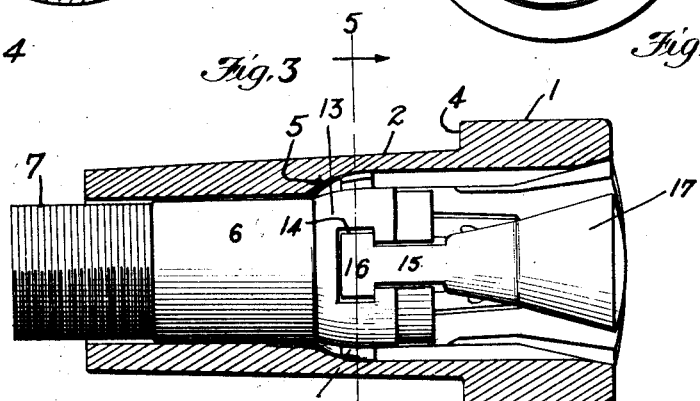
Fig. 3
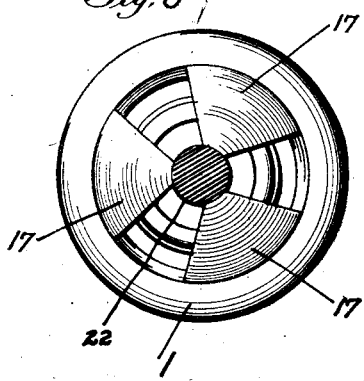
Fig. 6
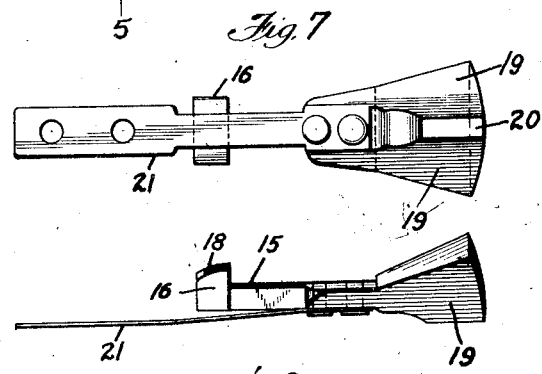
Fig. 7
Fig. 8
Inventor
G. J. Palaith
By H. J. Sanders
Atty.

Patented Aug. 14, 1928.

1,680,632

UNITED STATES PATENT OFFICE.

GEORGE J. PALAITH, OF CICERO, ILLINOIS.

SPRING COLLAR FOR LATHES AND SCREW MACHINES.

Application filed March 28, 1927. Serial No. 179,089.

This invention relates to improvements in spring collars for lathes or screw machines and its chief object is to provide a spring collar adapted to take work of different diameters. The one spring collar here provided may therefore take the place of several as at present it is customary to provide a separate spring collar for each specific diameter.

A further object is to provide a spring collar that is adapted for use interchangeably in a lathe or in a screw machine. A still further object is to provide a spring collar of simple construction, durable and efficient in operation and cheap to manufacture.

With the foregoing and other objects in view the invention consists in the combination and arrangement of parts to be hereinafter fully described, particularly pointed out in the claims and illustrated in the accompanying drawings which form a part of this application and in which—

Fig. 3 is a view of the spring collar, enlarged, in elevation, the jaws housing being shown in section to afford a better illustration.

Fig. 4 is a vertical sectional view taken on line 4—4 of Fig. 1.

Fig. 5 is a similar view taken on line 5—5 of Fig. 3.

Fig. 6 is a front view of Fig. 3.

Figs. 7 and 8 are plan and elevational views of one of the jaws of the spring collar.

Like reference characters denote corresponding parts throughout the several views.

Figure 1:
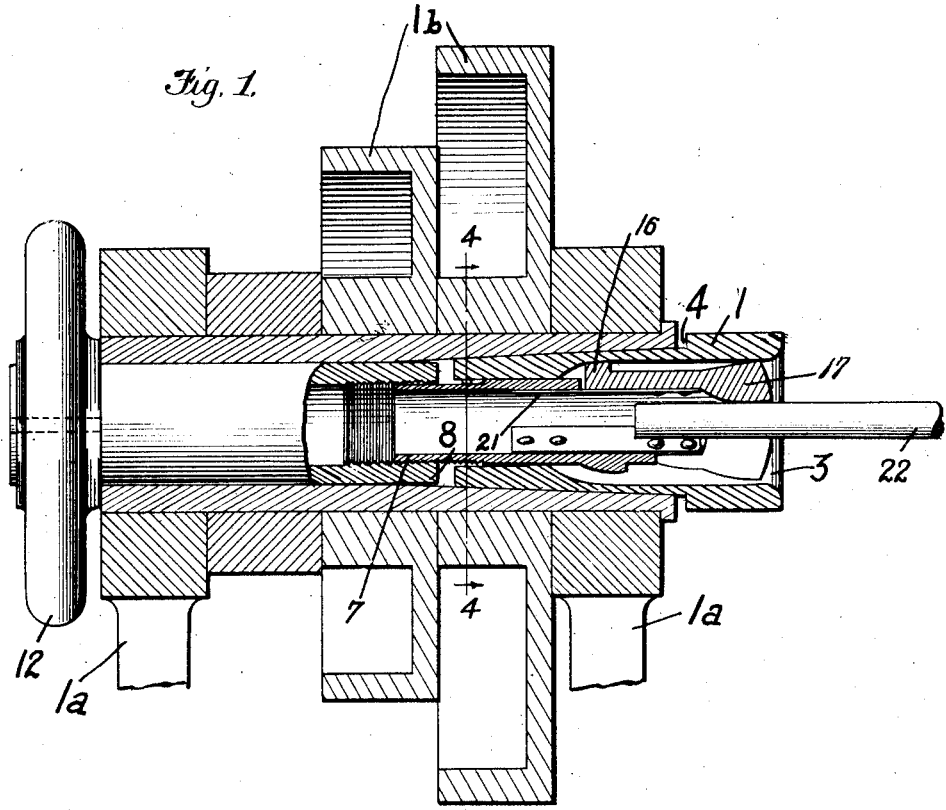
Fig. 1 is a vertical sectional view through a lathe spindle provided with the spring collar and illustrating its use.

The spring collar comprises a housing having a head 1 and a slightly tapered shank 2 the mouth 3 of said head being beveled outwardly and an exterior annular shoulder 4 being formed at the junction of the head and shank. The diminished end of the shank has a thicker wall than the forward end, the inner periphery of the shank being formed with the bevel 5 so that the interior diameter of the shank at its free or diminished end is materially less than at its forward end and less than the interior diameter of the head 1.

Figure 2:
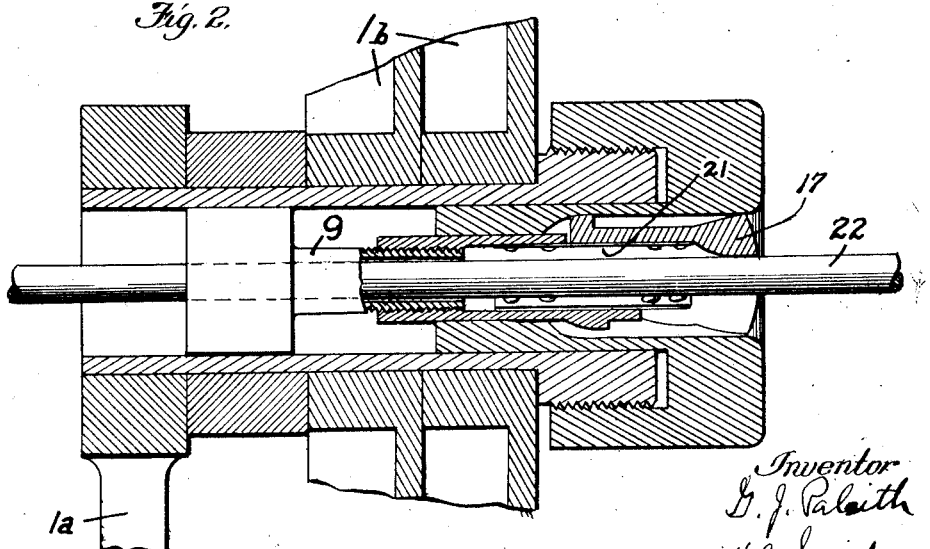
Fig. 2 is a similar view through a screw machine spindle provided with the spring collar.

The head and shank are round in cross section and are adapted for insertion in the spindle 8 of a lathe to displace the face plate, or for insertion in the nose of a screw machine. The housing 1, 2 receives a sleeve 6, one end 7 of which is either threaded exteriorly for engagement with the spindle of the lathe or threaded interiorly, as shown in Fig. 2, for attachment to the spindle 9 of a screw machine. The said sleeve 6 is formed also with a longitudinal groove 10 adapted to receive a lug 11 formed upon the inner periphery of the shank 2 so that the sleeve 6 will not be rotated when it is inserted in the lathe spindle. The lathe spindle is engaged with the sleeve 6 by rotating the hand wheel 12, said spindle being operatively supported in bearings $1^a$ and driven by the cone pulley $1^b$.

The sleeve 6 is formed further with the enlarged end 13 which is formed with three slots 14 which are 120 degrees apart and are adapted to receive the shanks 15 and the enlarged heels 16 of the jaws 17, each heel 16 having a beveled outer face 18 that projects beyond the shank 15, each heel having a greater width than the mouth of the slot 14 so that said heels cannot be withdrawn from said slots by movement longitudinally of the sleeve portions 13. There are three jaws 17, the relatively adjacent faces 19 thereof being beveled to form the longitudinal gripping surfaces 20.

The shank 15 of each jaw is engaged by a spring 21 that at its inner end is secured to the inner wall of the sleeve 6 whereby said jaws are retained in operative relation. The work 22 is inserted between the jaws 17 for lathe work as shown in Fig. 1 and as the sleeve 6 is moved into the shank 2 of the housing 1, 2 the beveled faces 18 of the heels 16 ride into engagement with the bevel 5 of the shank and the relatively remote faces of the jaws into engagement with the beveled mouth 3 of the head thus causing the jaws to bite upon the work holding it securely in adjusted position. The same movement of the sleeve 6 and jaws 17 of the spring collar shown in Fig. 2 causes the jaws to engage similarly with the work 22 which here is fed in from the opposite end of the spring collar.

What is claimed is:—

1. In a spring collar for lathes and screw machines, a housing comprising a head and a tapered and interiorly beveled shank, the mouth of said head being beveled, a lug integral with said shank, a threaded longitudinally recessed sleeve having one enlarged slotted end, the recess in said sleeve receiving the said lug, jaws arranged in the slotted end of said sleeve for frictional engagement with the beveled mouth of said head, heels integral with said jaws and formed with beveled faces for engagement with the interiorly beveled portion of said shank, and supporting springs for said jaws connecting the same and said sleeve.

2. In a spring collar for lathes and screw machines, a housing comprising a head and a tapered and interiorly beveled shank, the mouth of said head being beveled, a lug integral with said shank, a threaded longitudinally recessed sleeve having one enlarged multi-slotted end, the recess in said sleeve receiving said lug, jaws arranged in the slotted end of said sleeve for frictional engagement with the beveled mouth of said housing, said jaws being equidistant one from the other, heels integral with said jaws and extending outward radially therefrom, said heels terminating in beveled faces for engagement with the interiorly beveled portion of said shank, and supporting springs connecting the same and said sleeve.

In testimony that I claim the foregoing as my own I have hereto affixed my signature.

GEORGE J. PALAITH.